United States Patent [19]

Tanaka

[11] Patent Number: 4,591,532

[45] Date of Patent: May 27, 1986

[54] FLOORING

[75] Inventor: Yoshiharu Tanaka, Akashi, Japan

[73] Assignee: Bando Chemical Industries, Ltd., Hyogo, Japan

[21] Appl. No.: 776,147

[22] Filed: Sep. 13, 1985

[30] Foreign Application Priority Data

Sep. 25, 1984 [JP] Japan .................. 59-200200

[51] Int. Cl.⁴ .................................. B32B 25/12
[52] U.S. Cl. ................... 428/493; 428/493; 428/920; 428/921
[58] Field of Search ........ 180/90.6; 296/1 F; 15/215; 156/156, 214, 72, 242; 428/34, 67, 74, 76, 78, 493, 920, 921

[56] References Cited

U.S. PATENT DOCUMENTS

| | | | |
|---|---|---|---|
| 4,405,682 | 9/1983 | Fujita et al. | 428/317.7 |
| 4,428,999 | 1/1984 | George et al. | 428/246 |
| 4,444,825 | 4/1984 | Vanderstukken et al. | 428/920 |
| 4,480,011 | 10/1984 | Durand et al. | 428/474.4 |
| 4,520,057 | 5/1985 | Fujii et al. | 428/68 |

FOREIGN PATENT DOCUMENTS 1107557 10/1961 Fed. Rep. of Germany ...... 428/250

Primary Examiner—John E. Kittle
Assistant Examiner—Patrick Ryan
Attorney, Agent, or Firm—Auslander & Thomas

[57] ABSTRACT

A flooring to be used for vehicles, vessels, etc. The flooring comprises a lowermost rubber layer which makes direct contact with a floor board of a vehicle, a surface layer which constitutes a surface layer portion of the flooring and an intermediate layer interposed between the lowermost layer and the surface layer. The lowermost rubber layer contains a hydrate which discharges water of crystallization at the temperature of 150°–300° C. and accordingly prevents rise of surface temperature by discharging water of crystallization in case of fire in a vehicle and the intermediate layer checks heat conduction from the lowermost layer and thus rise of surface temperature of flooring can be controlled for many hours.

3 Claims, 3 Drawing Figures

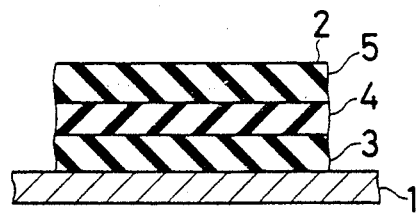
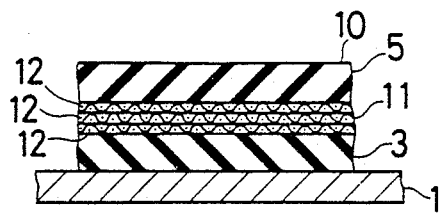
FIG. 1
FIG. 2
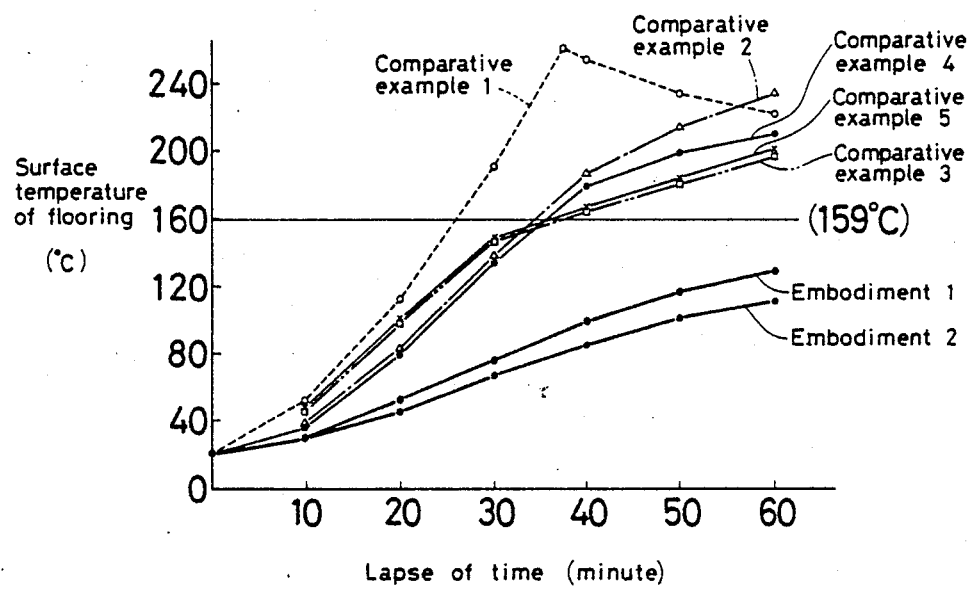
FIG. 3

FLOORING

BACKGROUND OF THE INVENTION

1. Field of the Invention

This invention relates to the flooring to be used for vehicles, vessels, etc.

2. Prior Art

For the flooring of vehicles, it is desired that when a fire broke out in a vehicle, the surface temperature of flooring does not rise abruptly in a short time to enable those in the vehicle to get out safely. For example, ASTM (American Standard Test Method) E-119 prescribes that when heat of nearly 900° C. was applied to a floor structure from below, the surface temperature of the flooring must not rise above 160° C. after the lapse of 60 minutes at the longest.

In the case of rubber flooring, it has been tried to meet the above requirement of ASTM by reducing its heat conductivity by making its thickness larger. However, in the case of rubber, it is considerably difficult to reduce its heat conductivity to a large extent from usual 0.4–0.5 Kcal/m.h. deg to about ½ of the former because of characteristics of rubber itself. Moreover, reduction of heat conductivity to about ½ is not sufficient to check abrupt rise of the surface temperature of flooring in case of fire and therefore flooring must be made considerably thicker. This involves an increase in the weight of a vehicle.

SUMMARY OF THE INVENTION

The present invention has for its object to provide the flooring which, even if it is comparatively thin, is free from abrupt rise of the surface temperature for many hours in case of fire.

In order to attain the above object, the flooring according to the present invention is made of a rubber compound containing a hydrate which discharges water of crystallization at the temperature within the range of 150°–300° C. It comprises a lowermost rubber layer which makes direct contact with a floor board of a vehicle, a surface layer which composes a flooring surface layer portion and an intermediate layer which controls heat conduction from the lowermost layer to the surface layer. These three layers are integrated into one by bonding.

In the flooring according to the present invention, since the lowermost rubber layer which makes contact with a floor board contains a hydrate, when the temperature of hydrate rises above 150° C., with the rise of a floor board temperature in case of fire, water of crystallization is discharged and this water of crystallization deprives the lowermost layer of evaporation heat and consequently controls the rise of the lowermost layer temperature. The reason why it is so devised that water of crystallization is discharged at 150° C. at the lowest is to prevent water of crystallization from being discharged in the vulcanizing process with is done at a temperature lower than 150° C. On the other hand, the reason why the water of crystallization discharging temperature is set below 300° C. is that at the time when water of crystallization is discharged at a temperature higher than 300° C., it is already difficult to maintain the surface temperature of flooring below 150°–160° C.

The intermediate layer bonded to the upper surface of the lowermost rubber layer containing a hydrate checks heat conduction from the lowermost rubber layer to the surface layer and thus controls the rise of surface temperature of the flooring.

As a hydrate of the lowermost layer, there are available hydrated compound, such as aluminium hydroxide ($Al_2O_3 \cdot 3H_2O$), hydroxy salt having structural water, aqua salt, such as $CaCl_2 \cdot 6H_2O$ having coordination water, salt such as $CaCl_2 \cdot 2H_2O$ having lattice water, salt having water hydrogen bonded to anion, sodium sulfite, etc. The water of crystallization discharging temperature of each hydrate given above is shown in Table 1.

TABLE 1

| Hydrate | Water of crystallization discharging temperature |
|---|---|
| $Al_2O_3 \cdot 3H_2O$ | 150–300° C. |
| $CaCl_2 \cdot 6H_2O$ | 200° C. |
| $CaCl_2 \cdot 2H_2O$ | 175° C. |
| $Na_2SO_3 \cdot 7H_2O$ | 150° C. |

One of the materials desirable for the intermediate layer is a rubber layer having a heat conductivity of less than 35 Kcal/m·h·deg. As a combining agent for reducing the heat conductivity of the rubber layer, there are available cork grains, chips of wood, glass balloon, inorganic balloon, waste fiber, waste cotton, etc.

Another material desirable for the intermediate layer is a canvas layer formed with at least two sheets of cotton canvas. Cotton which forms this canvas layer decomposes at a comparatively low temperature or at about 150° C. and after decomposition it carbonizes and lowers in its heat conductivity. Therefore, the temperature rise of this canvas layer after the canvas layer has reached the cotton decomposing temperature is checked while cotton is being decomposed and even after decomposition of cotton, the intermediate layer checks heat conduction to the surface layer due to reduction in its heat conductivity.

The surface layer can be formed with a material from which general function of flooring, namely, wear-resistance, slipping-resistance, chipping-resistance, cigarette-resistance, etc. can be obtained, for example a rubber compound.

Therefore, in the flooring according to the present invention the lowermost rubber layer is prevented from rising in temperature far above the water of crystallization discharging temperature while water of crystallization is discharged and heat conduction from the lowermost layer to the surface layer is checked by the intermediate layer. Thus, according to the present invention, even if the flooring is comparatively thin, the rise of surface temperature of flooring can be controlled for many hours in case of fire, namely, the flooring according to the present invention provides ample time to allow those in a vehicle to get out safely in case of fire and does not involve the increase in weight of a vehicle.

BRIEF DESCRIPTION OF THE DRAWING

FIG. 1 is a cross section of the flooring of Embodiment 1 of the present invention.

FIG. 2 is a cross section of the flooring of Embodiment 2 of the present invention, and FIG. 3 is a graph showing the thermal characteristics of each flooring of the embodiments and comparative examples.

DETAILES DESCRIPTION OF THE INVENTION

Preferred embodiments of the present invention are described below, with reference to the accompanying drawing.

EMBODIMENT 1

This embodiment is the case of applying the present invention to vehicles and is shown in FIG. 1. In FIG. 1, numeral 1 denotes a floor board of a vehicle. Provided on this floor board 1 is a flooring 2 of three-layer construction, more particularly, a lowermost rubber layer 3 which makes direct contact with the floor board 1 is formed with a rubber compound containing a hydrate, an intermediate layer 4 is formed with a rubber compound of low heat conduction and a surface layer 5 which constitutes a surface layer portion of the flooring 2 is formed with a rubber compound having a function of general flooring. These three layers are integrated into one by vulcanizing bonding.

The compounding of each of the layers 3, 4, 5 of the flooring 2 is as shown below.

| Compounding agent | Weight part |
|---|---|
| The lowermost rubber layer 3 (Compounding A) | |
| Natural rubber (RSS-4) | 50 |
| Regenerated rubber | 100 |
| Aluminium hydroxide | 100 |
| Zinc flowers | 5 |
| Stearic acid | 2 |
| Vulcanization accelerator (NOB) | 1.2 |
| Sulphur | 3 |
| Total | 261.2 |
| The intermediate layer 4 (Compounding B) | |
| Natural rubber (RSS-4) | 50 |
| Regenerated rubber | 100 |
| Soft calcium carbonate | 50 |
| Cork grains | 60 |
| Zinc flowers | 5 |
| Stearic acid | 2 |
| Vulcanization accelerator (NOB) | 1.2 |
| Sulphur | 3 |
| Total | 271.2 |
| The surface layer 5 (Compounding C) | |
| SBR NO. 1500 | 70 |
| High styrene SBR | 30 |
| Hard clay | 150 |
| Soft calcium carbonate | 70 |
| Naphthenic oil | 3 |
| Zinc flowers | 5 |
| Stearic acid | 2 |
| Vulcanization accelerator (MBTS) | 2.5 |
| Vulcanization accelerator (TS) | 0.2 |
| Sulphur | 5 |
| Total | 337.7 |

Heat conductivity of the lowermost rubber layer 3 0.380K cal/m · h · deg
Heat conductivity of the intermediate layer 4 0.210K cal/m · h · deg
Heat conductivity of the surface layer 5 0.410K cal/m · h · deg

EMBODIMENT 2

This embodiment relates to the flooring for a vehicle and is shown in FIG. 2. In a flooring 10 shown in FIG. 2, an intermediate layer 11 is formed in laminated state by bonding together three sheets of cotton canvas 12 with a bonding rubber. The others are almost the same as in the case of the flooring of Embodiment 1. The cotton canvas 12 is woven of warp of 20's 3-ply (density—74 strands/5 c.m.) and weft of the same construction as the warp. The decomposing temperature of cotton yarn is about 150° C.

THERMAL CHARACTERISTICS OF THE FLOORING OF EMBODIMENTS 1 AND 2

The thermal characteristics of the flooring of Embodiments 1 and 2 is explained below on the basis of the test in comparison with comparative examples.

The condition of floorings submitted to the test is as shown in Table 2.

The test was carried out in accordance with ASTM.E-119, namely, a flame at 892° C. was applied to each test piece from below a steel floor board and the speed of surface temperature rising of the test flooring at the room temperature of 20° C. was measured. The test results are shown in FIG. 3.

TABLE 2

| | Condition of lamination | Construction of layer | Thickness of layer (mm) | Total (mm) thickness |
|---|---|---|---|---|
| Embodiment 1 | Surface layer | Rubber layer of Compounding C | 2.0 | 5 |
| | Intermediate layer | Rubber layer of Compounding B | 1.5 | |
| | lowermost layer | Rubber layer of Compounding A | 1.5 | |
| Embodiment 2 | Surface layer | Rubber layer of Compounding C | 2.0 | 6 |
| | Intermediate layer | 3 sheets of cotton canvas bonded together | 2.0 | |
| | Lowermost layer | Rubber layer of Compounding A | 2.0 | |
| Comparative example 1 | Single layer | Rubber layer of Compounding C | 5.0 | 5 |
| Comparative example 2 | Upper layer | Rubber layer of Compounding C | 2.0 | 5 |
| | Lower layer | Rubber layer of Compounding B | 3.0 | |
| Comparative example 3 | Upper layer | Rubber layer of Compounding C | 2.0 | 5 |
| | Lower layer | Rubber layer of Compounding A | 3.0 | |
| Comparative example 4 | Surface layer | Rubber layer of Compounding C | 2.0 | 6 |
| | Intermediate layer | 3 sheets of nylon canvas bonded together | 2.0 | |
| | Lowermost layer | Rubber layer of Compounding D | 2.0 | |
| Comparative example 5 | Surface layer | Rubber layer of Compounding C | 2.0 | 6 |
| | Intermediate layer | 3 sheets of polyester canvas bonded together | 2.0 | |
| | Lowermost layer | Rubber layer of Compounding D | 2.0 | |

Nylon canvas of Comparative Example 4 is woven of warp of 20—denier 1—ply (density—74 strands/5 cm) and weft of the same construction as the warp. Polyester canvas of Comparative Example 5 is woven of warp of 870—denier 1—ply (density—74 strands/5 cm) and weft of the same construction as the warp. Both canvases are subjected to bonding treatment, similarly to cotton canvas of Embodiment 2 and are set to the same volume as the cotton canvas.

Rubber Compounding D of the lowermost layer of Comparative Example 4 and 5 is as shown below.

| Compounding agent | Weight part |
| --- | --- |
| SBR No. 1500 | 50 |
| Regenerated rubber | 100 |
| Soft calcium carbonate | 100 |
| Heavy calcium carbonate | 100 |
| Zinc flowers | 5 |
| Stearic acid | 2 |
| Vulcanization accelerator NOB | 1.2 |
| Sulphur | 4 |
| Total | 362.2 |

In FIG. 3, Embodiments 1 and 2 indicate that the surface temperature of flooring at the lapse of 60 minutes from the start of test is below 130° C. and this is deemed to allow ample time for those in a vehicle to get out safely in case of fire. From the comparison of flooring of Embodiment 1 with those of Comparative Examples 2 and 3, it can be seen that only either one of the rubber layer of low heat conduction and the rubber layer containing a hydrate is not sufficient enough to check the rise of surface temperature of flooring. The flooring of Comparative Example 2 is controlled in the rise of temperature better than Comparative Example 1 but at the lapse of about 35 minutes and thereafter, the flooring of Comparative Example 2 shows surface temperature exceeding 160° C. The flooring of Comparative Example 3 shows that the surface temperature is checked below 150° C. which is the water of crystallization discharging temperature bur at the lapse of about 35 minutes and thereafter, the surface temperature exceeds 160° C. Floorings of nylon canvas and polyester canvas as in the case of Comparative Examples 4 and 5 show better control of temperature rise than in the case of Comparative Example 1 which uses only rubber layers but their surface temperature exceeds 160° C. at the lapse of about 35 minutes and thereafter and satisfactory results cannot be obtained.

In each of the above embodiments, the lowermost rubber layer 3 and the surface layer 5 are of single layer but the construction of plural layers, namely, bonding lamination of at least two rubber layers of different compounding may be adopted. The surface layer 5 may be formed with other material, for example, synthetic resin such as vinyl chloride resin, wood, cloth (carpet), marble, etc., each having the function of general flooring.

In Embodiment 2, the intermediate layer is composed of three sheets of cotton canvas bonded together but may be composed of one sheet of cotton canvas, two sheets or more than four sheets of cotton canvas. Furthermore, in order to check the rise of surface temperature of flooring to a low extent for many hours, the intermediate layer may be made thicker.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A flooring to be used for vehicles and vessels, comprising:
   (a) a lowermost rubber layer which makes direct contact with a floor board for a vehicle and is formed with a rubber compound containing a hydrate which discharges water of crystallization at the temperature of 150°–300° C.
   (b) a surface layer, and
   (c) an intermediate layer which controls heat conduction from the lowermost layer to the surface layer, said three layers being laminated into one by bonding.

2. A flooring as defined in claim 1, wherein the intermediate layer is formed with rubber having the heat conductivity of less than 0.35 Kcal/m·h·deg.

3. A flooring as defined in claim 1, wherein the intermediate layer is formed with at least one sheet of cotton canvas.

* * * * *